June 26, 1934.  C. C. HAAS  1,964,465
PLANTER
Filed Dec. 4, 1933

Inventor
Clarence C. Haas
By V. F. Guague
Atty.

Patented June 26, 1934

1,964,465

UNITED STATES PATENT OFFICE 1,964,465

PLANTER

Clarence C. Haas, Richmond, Ind., assignor to International Harvester Company, a corporation of New Jersey Application December 4, 1933, Serial No. 700,824

9 Claims. (Cl. 111—48)

This invention relates to a tractor planter. More particularly it relates to an attachment for a tractor utilized for operating a planter pivotally connected thereto and drawn behind the tractor.

In check-row planting, the check-row wire is progressively moved along the end of the field as additional rows are planted. Although the wire is moved as far as its practicable when the planter starts from one end of the field, the wire lies in front of the planter on the return trip. In tractor drawn planters in which the wheels of the tractor are a substantial distance forward of the check head of the planter through which the wire is guided, the wire is apt to become entangled with the tractor wheels or with other parts of the tractor.

The principal object of the present invention is to provide guiding means for the check wire adjacent the tractor whereby the wire is maintained in clearance relation with respect to all parts of the tractor. Another object is to construct the guiding means so that it may be shifted from side to side of the tractor for use in either direction of operation. These objects and others, which will be apparent from the detailed description to follow, are accomplished by a construction such as shown in the drawing, in which.

Figure 1:
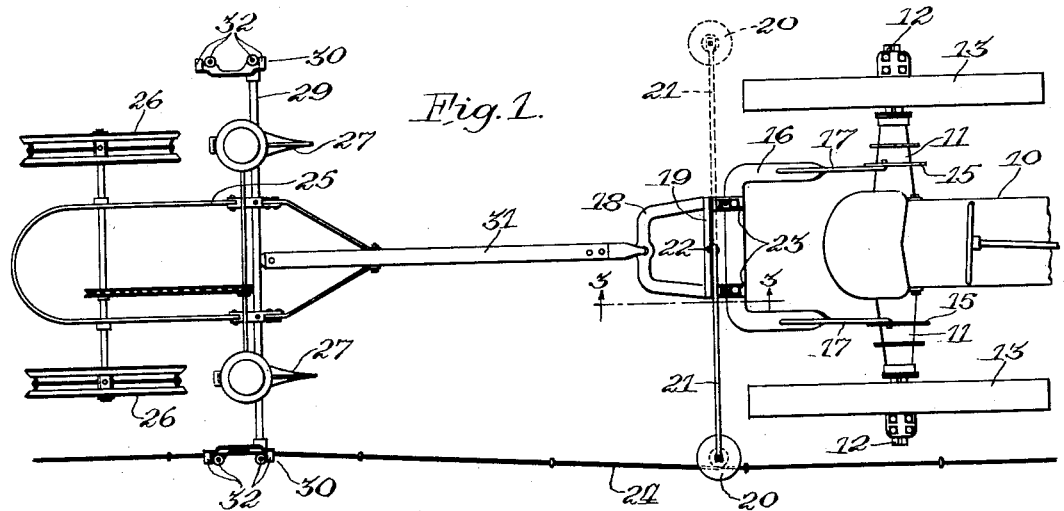
Figure 1 is a plan view of the rear end of a tractor and of a check-row planter pivotally attached thereto.
Figure 2:
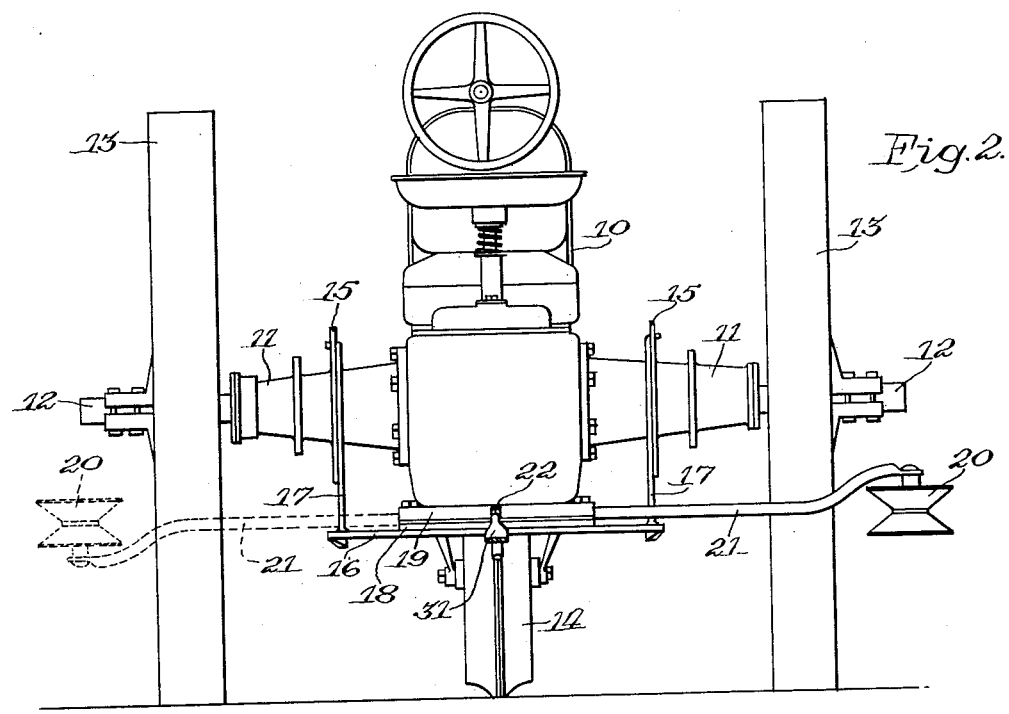
Figure 2 is a rear elevation of the tractor shown in Figure 1, the view being taken forwardly of the planter whereby the planter draft connection is shown in section; and, Figure 3 is a section taken on the line 3—3 of Figure 1.
Figure 3:
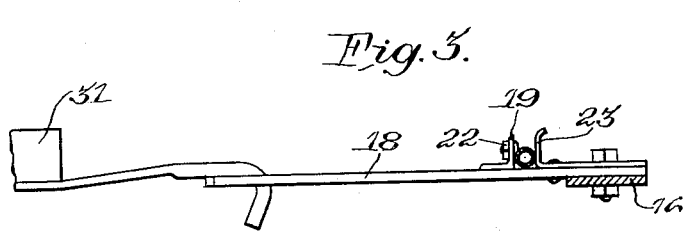

The tractor illustrated is of the general purpose type having a narrow body 10, laterally extending, rear axle housings 11, axles 12 extending laterally from the axle housings 11, wheels 13 mounted for axial adjustment on the axles 12, and a front steerable wheel 14. It is to be understood that the present invention can be incorporated with any type of tractor.

Flanges 15 mounted on the axle housings 11 form means for attaching a rearwardly extending U-shaped drawbar 16. Brace rods 17 form additional means for rigidly holding the drawbar in a horizontal position.

As shown, the drawbar 16 extends rearwardly of the wheels 13. An auxiliary drawbar 18 is rigidly bolted to the drawbar 16 and is, therefore, held in a horizontal plane. A transverse member 19 is secured to the auxiliary drawbar 18 rearwardly of the transverse portion of the main drawbar 16. A deeply grooved check-wire guide sheave 20 is rotatably supported on a vertical axis on a supporting arm 21. Said arm is pivotally secured at its inner end on the center line of the tractor to the transverse member 19 on the auxiliary drawbar 18. The supporting arm, as illustrated, is formed of a pipe formed at its inner end to form means for securing the pivot bolt 22.

The supporting arm 21 rests in either of its laterally extended positions on the corresponding portion at that side of the auxiliary drawbar 18. Said arm is held against rearward pivoting by contact with the transverse member 19. It is held against pivoting movement in a forward direction by guide members 23 which are secured to the side portions of the auxiliary drawbar 18. Said members are spaced from the transverse member 19 a sufficient distance to provide a slot for the supporting arm 21. The brackets are bent outwardly at their upper ends to allow insertion of the supporting arm between the brackets and the transverse member 19.

The supporting arm 21 is bent upwardly adjacent its outer end for supporting the guide sheave 20, so that the pressure of a check-wire 24 operating over the sheave will be in a horizontal direction substantially in alignment with the pivot point of the supporting arm, whereby there will be very little tendency to lift the supporting arm out of its position of rest on the auxiliary drawbar 18. The guide sheave 20 is supported in a lateral position a sufficient distance beyond any parts of the tractor to prevent contact of the wire at any time with said parts.

A two-row planter of a conventional construction having a frame 25, wheels 26, furrow openers 27, a transverse support 29, check heads 30, and conventional seeding mechanism, not shown in detail, is pivotally attached to the auxiliary drawbar 18 by means of a draft tongue 31. The check-wire 24 extends over and through suitable guide rollers 32 mounted on the check head 30. In conventional planters of this type, buttons on the check-wire engage a check fork carried on the check head for operating the seed dispensing mechanism. It will be noted that the guide sheave 20 carries the wire 24 laterally a distance greater than the lateral distance of the check heads 32. However, the guide rollers 32 on the check head are capable of taking care of an appreciable angular deflection of the check-wire, either entering or leaving the check head. By carrying the check-wire on the check sheave 20 away from the tractor, interference of the wire with parts of the tractor is prevented. In horse drawn planters, the horses are much nearer the planter check heads than the position of the tractor as illustrated. This is necessary as a substantial longitudinal distance is required between the planter and the tractor for turning operations. In horse drawn planters, the provision of a guide sheave ahead of the transverse support would not possess any appreciable utility, as a slight angular deflection would not bring the wire into contact with the draft animals. However, in a tractor drawn planter as illustrated, a real problem was involved, which was solved by provision of a shiftable check-wire support as illustrated and as defined in the following claims.

What is claimed is:

1. A tractor and planter organization comprising a tractor, a check-row planter connected to the tractor, said planter being provided with a check head for a check wire, and a check wire guide sheave supported on the tractor longitudinally spaced from the check head for engaging the check wire and maintaining it out of contact with the tractor.

2. A tractor and planter organization comprising a tractor, a check-row planter connected to the tractor, said planter being provided at one side of the tractor with a check head for a check wire, and a check wire guide sheave supported on the tractor longitudinally spaced from the check head for engaging the check wire and maintaining it out of contact with the tractor.

3. A tractor and planter organization comprising a tractor, a check-row planter connected to the tractor, said planter being provided with check heads at opposite sides of the tractor for a check wire, a support pivoted on the tractor adjacent the longitudinal center line thereof on a longitudinal axis and extending laterally beyond the tread line of the tractor, and a check wire guide sheave mounted on said support positioned to engage the check wire substantially in longitudinal alignment with the check head for maintaining it out of contact with the tractor.

4. A tractor and planter organization comprising a tractor, a check-row planter connected to the tractor, said planter being provided with check heads at opposite sides of the tractor for a check wire, a support pivoted on the tractor adjacent the longitudinal center line thereof on a longitudinal axis for swinging to either side of the tractor, said support in position at either side extending laterally beyond the tread line of the tractor at that side, and a check wire guide sheave mounted on said support positioned to engage the check wire substantially in longitudinal alignment with the check head for maintaining it out of contact with the tractor.

5. In a tractor and planter organization including a tractor and a check-row planter pivotally connected to the tractor and in combination therewith, a check wire guide mounted on the tractor with the wire receiving portion thereof located beyond the tread line of the tractor.

6. In a tractor and planter organization including a tractor and a check-row planter pivotally connected to the tractor and in combination therewith, a check wire guide adjustably mounted on the tractor for positioning at either side thereof beyond the tread line of the tractor.

7. A tractor planter organization comprising a tractor, a check-row planter pivotally secured to the tractor, said planter being provided with check heads for a check wire, and a check wire guide sheave supported on the tractor laterally beyond the tread line thereof for engaging the check wire and maintaining it out of contact with the tractor.

8. A tractor planter organization comprising a tractor, a drawbar extending rearwardly from the tractor, a check-row planter pivotally secured to said drawbar, said planter being provided with check heads for a check wire, and a check wire guide sheave pivotally supported on the tractor on a central longitudinal axis and extending laterally beyond the tread line thereof for engaging the check wire and maintaining it out of contact with the tractor.

9. In a tractor planter organization including a tractor having a rearwardly extending drawbar and a check-row planter pivotally connected thereto for operation in a trailing position, said planter being provided with a check head, and in combination therewith; a check wire guide comprising a support pivoted on a central line of the tractor rearwardly of the rear wheels and swingable to either side of the tractor, and a guide sheave carried on the outer end of said support.

CLARENCE C. HAAS.